(12) United States Patent
Nguyen et al.

(10) Patent No.: US 7,529,898 B2
(45) Date of Patent: May 5, 2009

(54) METHOD FOR BACKING UP AND RESTORING DATA

(75) Inventors: Lu Nguyen, San Jose, CA (US); John R. Paveza, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 10/888,711

(22) Filed: Jul. 9, 2004

(65) Prior Publication Data

US 2006/0010174 A1      Jan. 12, 2006

(51) Int. Cl.
*G06F 12/00*      (2006.01)

(52) U.S. Cl. .................. 711/162; 707/100; 707/200; 707/202; 711/100

(58) Field of Classification Search .............. None
See application file for complete search history.

(56) References Cited

U.S. PATENT DOCUMENTS

| | | | |
|---|---|---|---|
| 5,890,165 A | 3/1999 | Boudrie et al. |
| 5,937,415 A | 8/1999 | Sheffield et al. |
| 6,014,674 A | 1/2000 | McCargar |
| 6,044,369 A | 3/2000 | Black |
| 6,345,368 B1 | 2/2002 | Bergsten |
| 6,374,366 B1 | 4/2002 | Maffezzoni |
| 6,427,168 B1 | 7/2002 | McCollum |
| 6,560,591 B1 | 5/2003 | Memmott et al. |
| 2002/0013808 A1 | 1/2002 | Case et al. |
| 2002/0156921 A1 | 10/2002 | Dutta et al. |
| 2002/0194208 A1 | 12/2002 | Knoll et al. |
| 2003/0014432 A1 | 1/2003 | Teloh et al. |
| 2003/0037177 A1 | 2/2003 | Sutton et al. |
| 2003/0055808 A1 | 3/2003 | Bhat |
| 2006/0149889 A1* | 7/2006 | Sikha .......................... 711/100 |

OTHER PUBLICATIONS

Nguyen et al., U.S. Appl. No. 10/888,712, titled "Method and system for performing a backup by querying a backup infrastructure", filing date Jul. 9, 2004, 23 pages plus 6 drawing sheets.

"Managing A Storage Array Using CIM Schema 2.7", Revision 0.14, Work-in-Progress Draft, Sep. 13, 2002, pp. 1-35, Storage Networking Industry Association, San Francisco.

"SNIA Storage Management Initiative Specification Version 1.0.1", Sep. 12, 2003, pp. 1-644, Storage Networking Industry Association, San Francisco.

"CIM Tutorial", Jun. 13, 2003, pp. 1-105, Distributed Management Task Force, Portland.

* cited by examiner

*Primary Examiner*—Charles Rones
*Assistant Examiner*—Belix M Ortiz
(74) *Attorney, Agent, or Firm*—Rabindranath Dutta; Konrad Raynes & Victor LLP

(57) ABSTRACT

One aspect of the invention is a method for backing up data. An example of the method includes creating a description of a backup. The description of the backup may be created in response to receiving a request to perform a backup. This example also includes receiving a block of data to be backed up. This example further includes generating a packet that includes the block of data and metadata, wherein the block of data and the metadata are included in a common information protocol object. This example additionally includes transmitting the packet. This example may also include extracting the block of data from the packet, and storing the block of data on a storage device. If desired, this example may further include restoring the data block from the storage device.

17 Claims, 6 Drawing Sheets

500

| Byte/Bit | 0-1 | 2-3 | 4-5 | 6-7 |
|---|---|---|---|---|
| 0...n | TCP/IP Header 504 | | HTTP Header 506 | |
| n...n1 | CIM-XML Wrapper 508 | | Size 510 | Date/Time 512 |
| n1...n2 | Source machine 514 | Destination machine 516 | Type (backup or restore) 518 | Backup type (inc., dif, etc.) 520 |
| n2...n3 | Sequence number 522 | Source location 524 | Reserved 526 | |
| n3...4 | Proprietary extensions 528 | | Padding 530 | |
| n4...5 | Data 532 | | | |
| n5...6 | | | | |

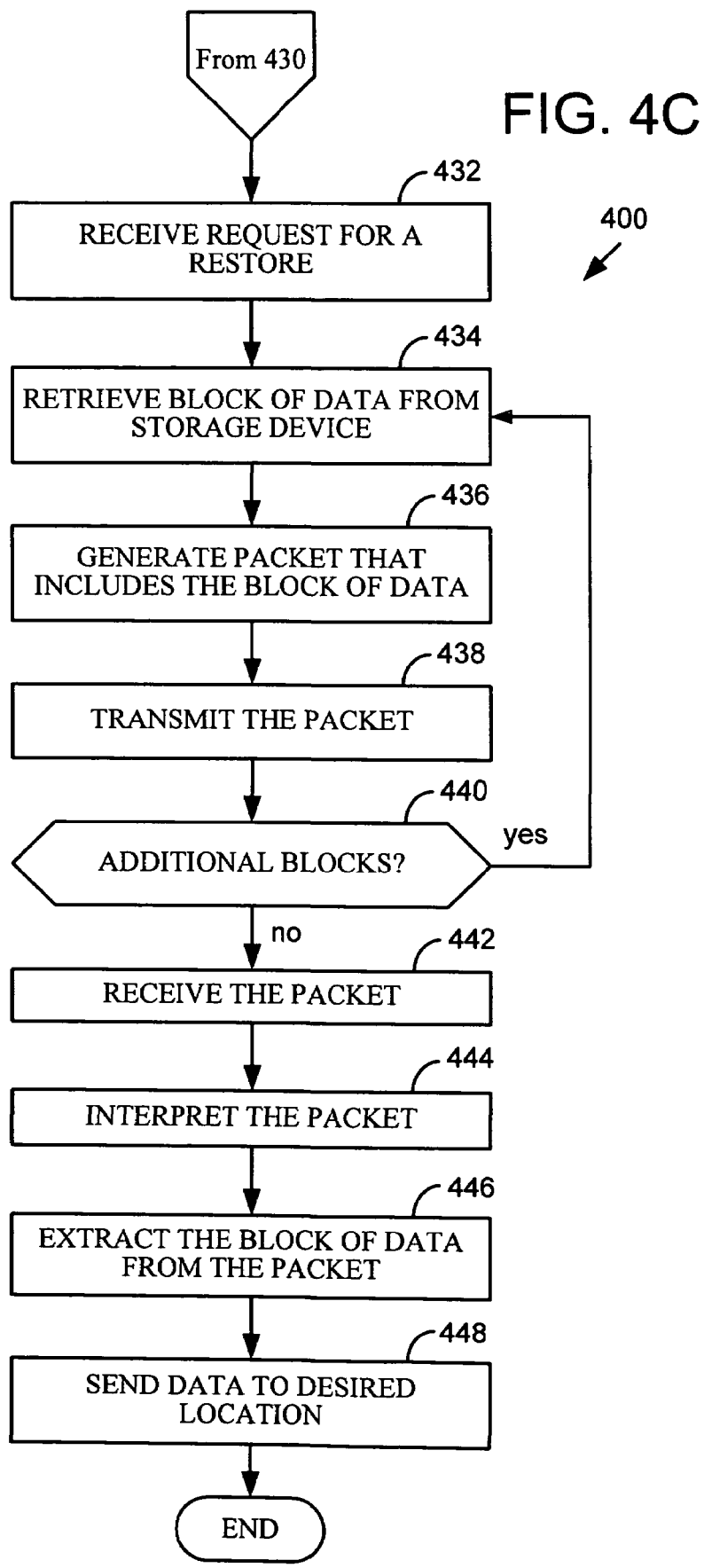

500

| Byte/Bit | 0-1 | 2-3 | 4-5 | 6-7 |
|---|---|---|---|---|
| 0...n | TCP/IP Header 504 | | HTTP Header 506 | |
| n...n1 | CIM-XML Wrapper 508 | | Size 510 | Date/Time 512 |
| n1...n2 | Source machine 514 | Destination machine 516 | Type (backup or restore) 518 | Backup type (inc., dif, etc.) 520 |
| n2...n3 | Sequence number 522 | Source location 524 | Reserved 526 | |
| n3...4 | Proprietary extensions 528 | | Padding 530 | |
| n4...5 | Data 532 | | | |
| n5...6 | | | | |

FIG. 5

METHOD FOR BACKING UP AND RESTORING DATA

BACKGROUND

1. Technical Field

The present invention relates to backing up information in a computing system. More particularly, some examples of the invention concern using the Common Information Model (CIM) to describe data backup types and backup and restore objects.

2. Description of Related Art

Important data is often stored in computing systems. Frequently, a backup copy of data is made to prevent data from being lost if data becomes corrupted. If data becomes corrupted, the data can be restored from the backup copy. Consequently, it is important to be able to reliably back up data.

In a typical backup implementation, a backup client obtains data that is to be backed up, for example data from a database, and sends the data to a backup server. The backup server then stores the data on a storage device, such as a hard disk drive or tape. To retrieve the backup copy of the data, the backup server obtains the data from the storage device and sends the data to the backup client. The backup client then restores the data to the proper location.

In modern computing systems, operations for backing up and restoring data can be very complex. For example, there are several different types of backups that may be performed. Different types of backups include, for example, full, incremental (which includes all data since the previous incremental backup), differential (which includes all data since the previous full backup), copy (wherein the database does not truncate logs), LAN-free (which is over Fibre Channel), serverless (which bypasses the server such that data is sent directly from a host to a backup storage device), and $3^{rd}$ party (wherein the data is sent directly from a host storage device to a backup storage device).

Further, different vendors of backup/restore products typically implement the various types of backups differently, using proprietary client and server communications protocols and overhead. As a result, each vendor's implementation is incompatible with every other vendor's implementation. For example, a VERITAS NetBackup™ backup server cannot be used with an IBM® Tivoli® Storage Manager backup client. This incompatibility prevents users from being able to use backup clients and backup servers obtained from different vendors, for example to take advantage of strengths of particular products. Thus, with the current approach, customers are "locked in" to a particular vendor, and must continue to purchase products from that single vendor, or alternatively, expend the funds required to replace their entire backup infrastructure. Consequently, known techniques for backing up data are inadequate because users cannot mix and match backup clients and backup servers obtained from different vendors.

SUMMARY

One aspect of the invention is a method for backing up data. An example of the method includes creating a description of a backup. The description of the backup may be created in response to receiving a request to perform a backup. This example also includes receiving a block of data to be backed up. This example further includes generating a packet that includes the block of data, and metadata, wherein the block of data and the metadata are included in a common information protocol object. This example additionally includes transmitting the packet. This example may also include extracting the block of data from the packet, and storing the block of data on a storage device.

This example may also include receiving a request to restore at least some of the data. Further, this example may include retrieving a block of backed up data from a storage device. This example may additionally include generating a secondary data packet that includes the block of backed up data, wherein the block of backed up data is included in a common information protocol object. This example may also include transmitting the secondary data packet.

Other aspects of the invention are described in the sections below, and include, for example, a computing system, and a signal bearing medium tangibly embodying a program of machine-readable instructions executable by a digital processing apparatus to perform operations for backing up data.

Some examples of the invention advantageously permit backup and restore operations to be performed using backup clients and backup servers from different vendors. Further, some examples of the invention are easily extensible to permit additional capabilities to be added. The invention also provides a number of other advantages and benefits, which should be apparent from the following description.

BRIEF DESCRIPTION OF THE DRAWINGS

FIGS. 4A, 4B, and 4C are a flowchart of an operational sequence for backing up (and restoring) data in accordance with an example of the invention.

FIG. 5 is a representation of a packet in accordance with an example of the invention.

DETAILED DESCRIPTION

Figure 1:
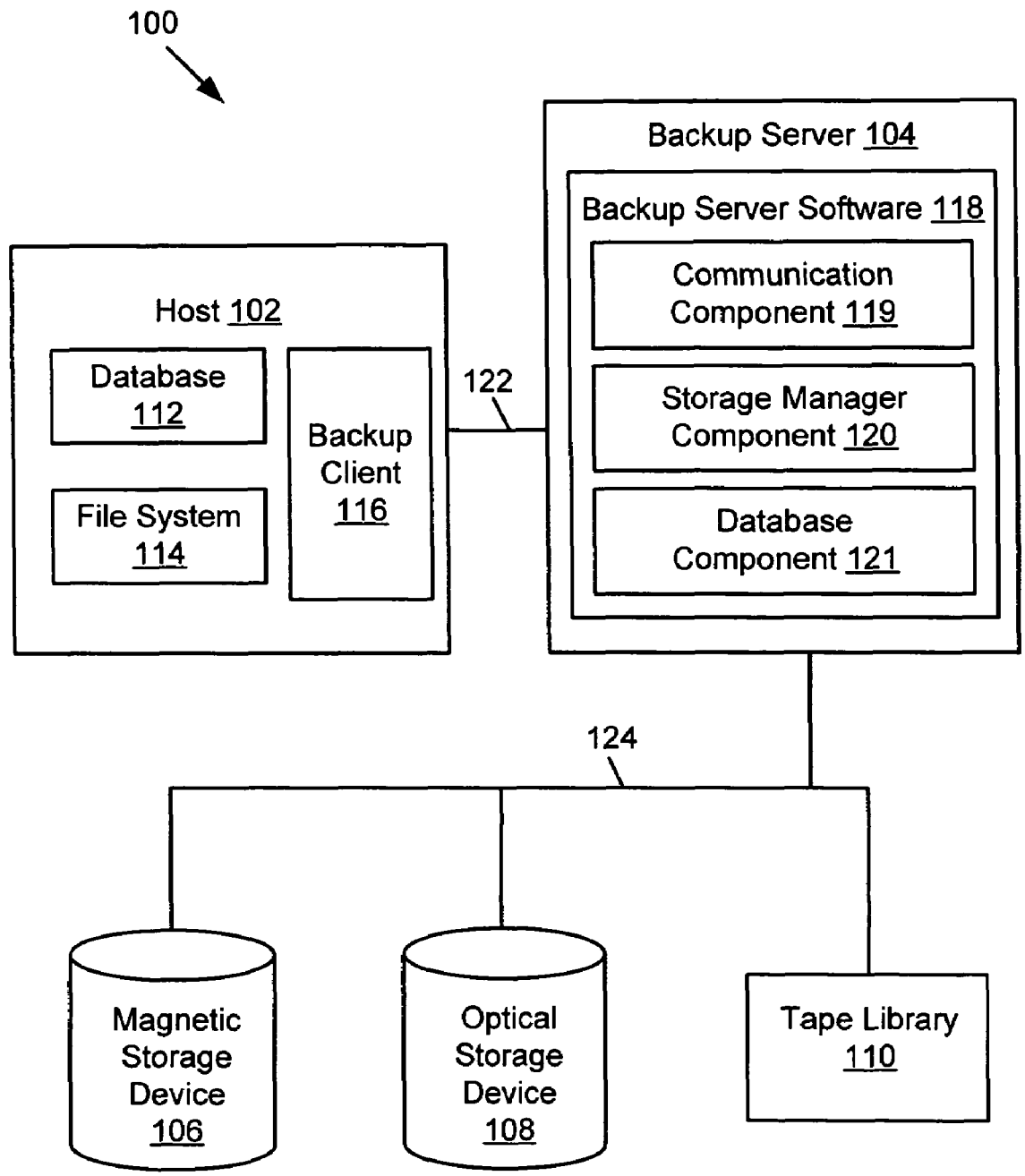
FIG. 1 is a block diagram of the hardware components and interconnections of a computing system in accordance with an example of the invention.

The nature, objectives, and advantages of the invention will become more apparent to those skilled in the art after considering the following detailed description in connection with the accompanying drawings.

I. Hardware Components and Interconnections

One aspect of the invention is a computing system for backing up and restoring data. As an example, the computing system may be embodied by all, or portions of, the computing system 100 shown in FIG. 1. The computing system 100 may include one or more hosts 102, one or more backup servers 104, and one or more storage devices 106, 108, 110.

The host 102 may include a database 112, a file system 114, and a backup client 116. As an example, the host 102 may be an IBM eServer xSeries model x445 server, or any other suitable computing device. The backup server 104 may include backup server software 118, which may include a communication component 119 (for communicating with the host 102), a storage manager component 120, and a database component 121. The database component may keep a record of all of the backups and restores that have occurred. As an example, IBM® TIVOLI® Storage Manager may be used for the backup server software. As another example, the backup server may be an IBM eServer® pSeries 690, or any other suitable computing device. In an alternative embodiment, the backup server could be implemented on the host 102.

The host 102 may be coupled to the backup server 104 via a communications link 122. As an example, the communications link 122 may support TCP/IP or Fibre Channel protocols, and may be a Wide Area Network (WAN), a Local Area Network (LAN), a Storage Area Network (SAN), or any other suitable type of communications link or network. In another example, the host 102 and the backup server 104 could communicate via shared memory. In another example, a named pipe may be used in instances where the backup client and the backup server software are installed on the same machine. The backup server 104 may be coupled to the storage devices 106, 108, 110 with a communications link 124. As an example, the communications link 124 may support SCSI, iSCSI, or Fibre Channel protocols, and may be a WAN, LAN, SAN, or any other suitable type of communications link or network. As an example, the storage devices may include a magnetic storage device 106 (which for example may comprise one or more hard disk drives), an optical storage device 108 (which for example may comprise one or more CD or DVD drives), and a tape library storage device 110. In further examples, the magnetic storage device 106 may be an IBM TotalStorage Enterprise Storage Server (ESS) model 2105, and the tape library storage device 110 may be an IBM TotalStorage 3494 Enterprise Tape Library. However, the storage devices may be any suitable types of storage devices. For example, each of the storage devices could include one or more of the following: a CD-ROM, CD-R, CD-RW, WORM, DVD-R, DVD+R, DVD-RW, or DVD+RW drive, a magnetic storage "hard disk drive", a RAID array, a magnetic data storage diskette (such as a floppy disk), a magnetic tape data storage device, a digital optical tape data storage device, and/or a magneto-optical data storage device.

Figure 2:
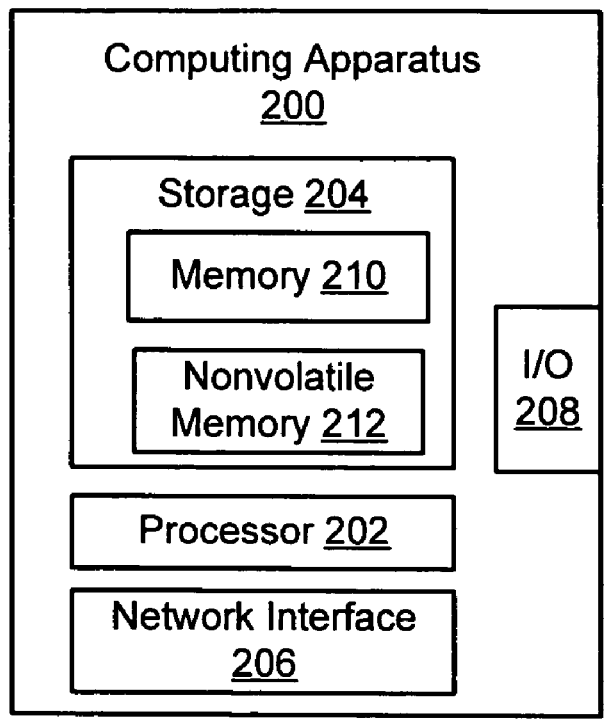
FIG. 2 is a block diagram of the hardware components and interconnections of a computing apparatus in accordance with an example of the invention.

An exemplary computing apparatus 200 is shown in FIG. 2. As an example, the host 102, the backup server 104, and any other computing devices in the computing system 100 could be implemented with an embodiment of the computing apparatus 200. The computing apparatus 200 includes a processor 202 (which may be called a processing device), and in some examples could have more than one processor 202. As an example, the processor may be a PowerPC RISC processor, available from International Business Machines Corporation, or a processor manufactured by Intel Corporation. The processor 202 may run any suitable operating system, for example, Windows 2000, AIX, Solaris™, Linux, UNIX, or HP-UX™. The computing apparatus 200 may be implemented on any suitable computer, for example a personal computer, a workstation, a server computer, a mainframe computer, or a supercomputer. The computing apparatus 200 also includes a storage 204, a network interface 206, and an input/output 208, which are all coupled to the processor 202. The storage 204 may include a primary memory 210, which for example, may be RAM, and a non volatile memory 212. The non-volatile memory 212 could be, for example, a hard disk drive, a drive for reading and writing from optical or magneto-optical media, a tape drive, non-volatile RAM (NVRAM), or any other suitable type of storage. The storage 204 may be used to store data and application programs and/or other programming instructions executed by the processor. The network interface 206 may provide access to any suitable wired or wireless network or communications link.

II. Operation

In addition to the hardware embodiments described above, other aspects of the invention concern a method for backing up data, and for restoring data.

A. Signal-Bearing Media

In the context of FIGS. 1 and 2, the method aspects of the invention may be implemented, for example, by having the host 102 and/or the backup server 104 execute a sequence of machine-readable instructions, which can also be referred to as code. These instructions may reside in various types of signal-bearing media. In this respect, some aspects of the present invention concern a programmed product, comprising a signal-bearing medium or signal-bearing media tangibly embodying a program of machine-readable instructions executable by a digital processing apparatus to perform operations for backing up data, and/or for restoring data.

Figure 3:
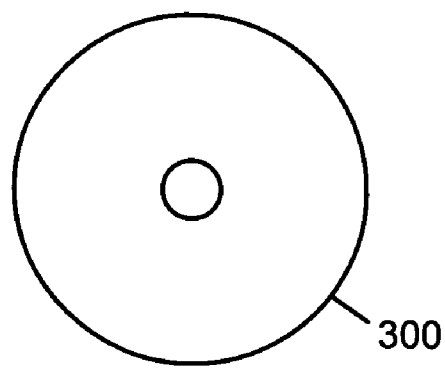
FIG. 3 is an example of a signal-bearing medium in accordance with an example of the invention.

This signal-bearing medium may comprise, for example, primary memory 210 and/or non-volatile memory 212. Alternatively, the instructions may be embodied in a signal-bearing medium such as the optical data storage disc 300 shown in FIG. 3. The optical disc can be any type of signal bearing disc or disk, for example, a CD-ROM, CD-R, CD-RW, WORM, DVD-R, DVD+R, DVD-RW, or DVD+RW. Additionally, whether contained in the computing system 100, or elsewhere, the instructions may be stored on any of a variety of machine-readable data storage mediums or media, which may include, for example, a "hard disk drive", a RAID array, a magnetic data storage diskette (such as a floppy disk), magnetic tape, digital optical tape, RAM, ROM, EPROM, EEPROM, flash memory, programmable logic, any other type of firmware, magneto-optical storage, paper punch cards, or any other suitable signal-bearing media including transmission media such as digital and/or analog communications links, which may be electrical, optical, and/or wireless. For example, in some embodiments the instructions or code may be accessible from a file server over a network, or from other transmission media, and the signal bearing media embodying the instructions or code may comprise a transmission media, such as a network transmission line, wireless transmission media, signals propagating through space, radio waves, and/or infrared signals. Alternatively, the signal bearing media may be implemented in hardware logic, for example, an integrated circuit chip, a Programmable Gate Array (PGA), or an Application Specific Integrated Circuit (ASIC). As an example, the machine-readable instructions may comprise software object code, compiled from a language such as "C++".

B. Overall Sequence of Operation

Figure 4A:
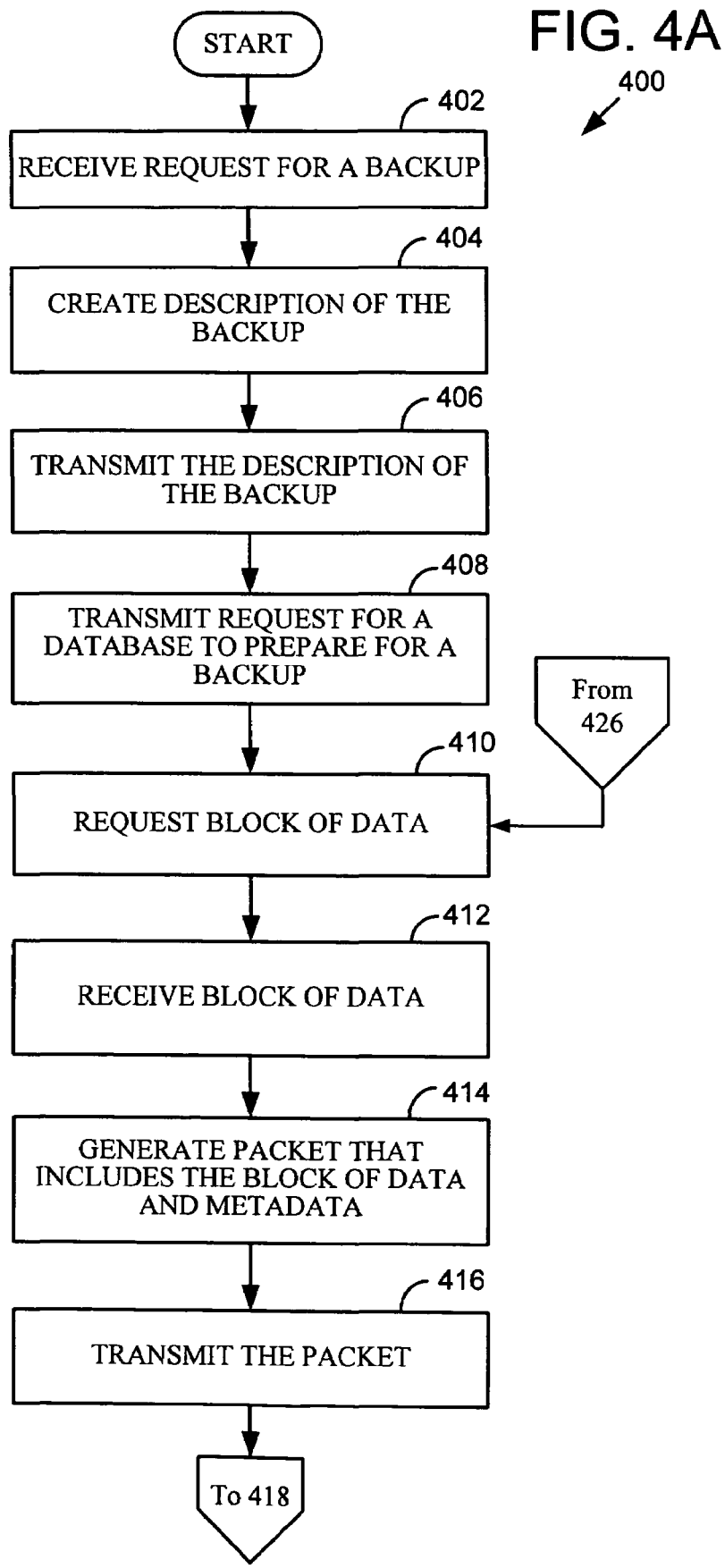
Figure 4B:
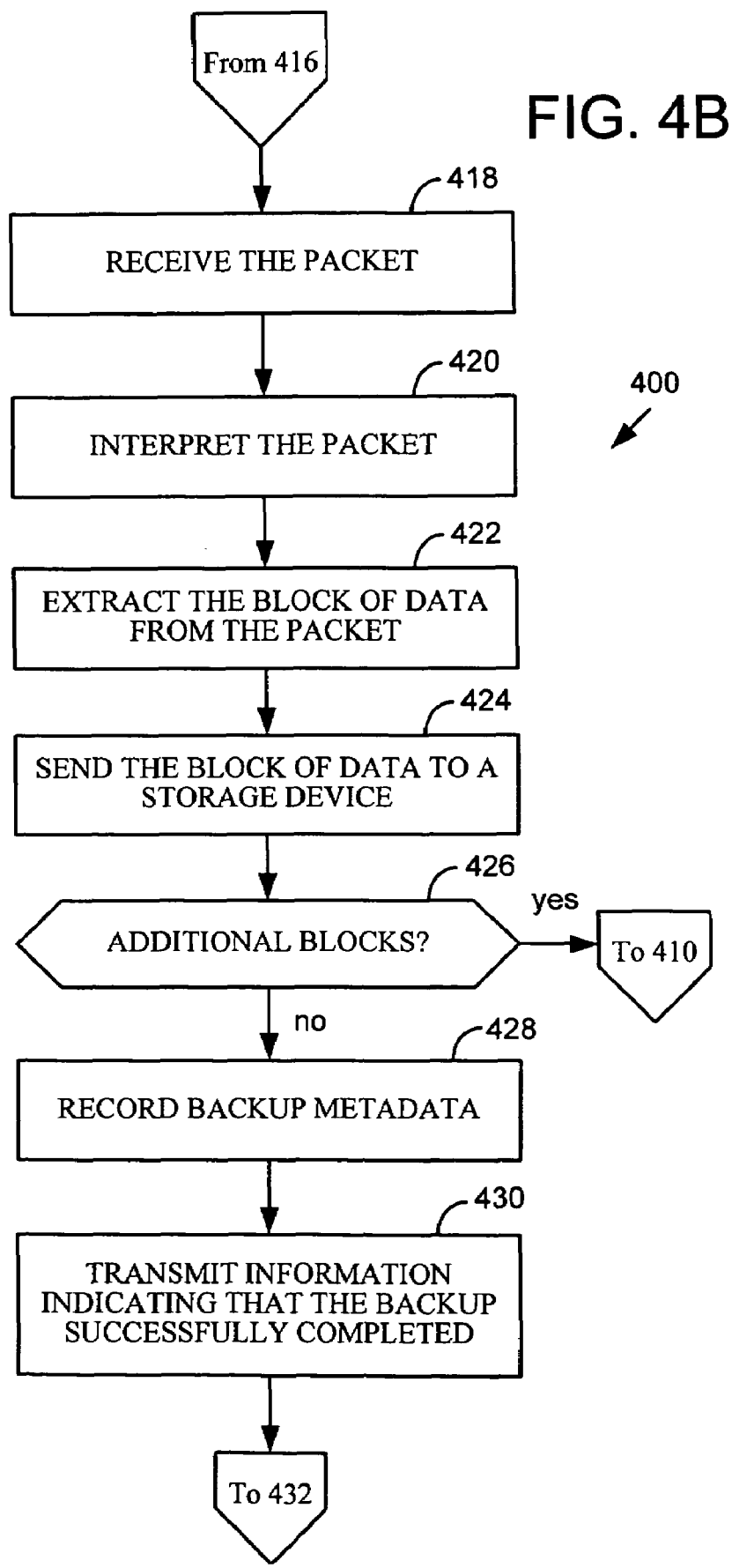

For ease of explanation, but without any intended limitation, exemplary method aspects of the invention are described with reference to the computing system 100 described above and shown in FIG. 1. An example of the method aspect of the present invention is illustrated in FIGS. 4A-C, which show a sequence 400 for a method for backing up data (which may also include restoring data).

Operations of the sequence 400 may be performed by the host 102, and in some embodiments may be performed by the host 102 in conjunction with the backup server 104. Referring to FIG. 4A, sequence 400 may include, and may begin with, operation 402, which comprises receiving a request for a backup. For example, a user may use backup client 116 to request a backup. In other examples, a backup request may be received based on a schedule, or a business policy. The sequence 400 may also include operation 404, which comprises creating a computer readable description of the backup, wherein the description of the backup includes a backup type. The backup may be described by the backup client 116 for use by the backup server 104, using a well known Application Programming Interface (API). As an example, the description of the backup may be written in a markup language, for example XML. Further, the description may be a common information protocol object. As an example, the common information protocol may be the Common Information Model (CIM), which is well defined and well supported. As a further example, the backup type may be described with an XML tag. (However, using XML is not required). Examples of backup types include full, incremental, differential, and copy. Additional backup types include snapshot, serverless, LAN, and LAN-free As an example, a description of a backup may include a backup type chosen from the group consisting of full, incremental, differential, and copy, and may also include an additional backup type chosen from the group consisting of snapshot, serverless, LAN, and LAN-free. Additional backup types may be easily supported by modifying the XML tag or by adding additional XML tags.

The sequence 400 may also include operation 406, which comprises transmitting the description of the backup. As an example, the description of the backup may be transmitted from the backup client 116 to the backup server 104. The sequence 400 may also include operation 408, which comprises transmitting a request (for example from the backup client 116), for a database (for example), to prepare for a backup. The sequence 400 may also include operation 410, which comprises requesting a block of data, for example, using a well known API. For example, the backup client 116 may request a block of data from the database 112. The sequence 400 may also include operation 412, which comprises receiving the block of data to be backed up from the application or database. For example, the backup client 116 may receive the block of data to be backed up from the application or database.

The sequence 400 may also include operation 414, which comprises generating a packet that includes the block of data. As an example, the packet may include at least some information written in a markup language, for example XML. The packet may be created by the backup client 116, which may wrap the data block in the packet. Generally, the packet may include other information, which may be called metadata, and the backup data and metadata may be encapsulated in the packet, which is universally readable. In some examples, the packet may be called an XML packet. The packet may include a common information protocol object that is a description of the block of data. As an example, the common information protocol may be CIM. The metadata may include, for example, a destination address, the source address, the date, time, host name, and original location of the data, and may also include information identifying the contents of the block of data and information about the data that is backed up, for example, whether the data is a database, a filesystem, or other object, and may also include the size, format, and sequence of each block of data, and of the entire backup. Some or all of the metadata may also be included in the description of the backup. For example, date and time information will typically be included in the description of the backup.

FIG. 5 is a representation of a packet 500 in accordance with an example of the invention. The packet 500 includes a TCP/IP header 504, a HTTP header 506, and a CIM/XML wrapper 508. The packet 500 may also include, for example, data size information 510, date/time information 512, source machine identifying information 514, destination machine identifying information 516, type indicator (backup or restore) 518, backup type identifier (incremental, differential, etc.) 520, sequence number 522, source location information 524, reserved bits 526, space for proprietary extensions 528, padding 530, and data 532.

Referring again to FIG. 4A, the sequence 400 may also include operation 416, which comprises transmitting the packet, for example, from the backup client 116 on the host 102, to the backup server 104, for example using TCP/IP.

Referring to FIG. 4B, the sequence 400 may also include operation 418, which comprises receiving the packet, for example, at the backup server 104. The sequence 400 may also include operation 420, which comprises interpreting the packet. The sequence 400 may also include operation 422, which comprises extracting the block of data from the packet. The backup server 104 may interpret the packet and extract the block of data. The backup server 104 may interpret the packet using a common set of rules that are understood by the backup client 116 and by other servers. This common set of rules, along with the universally readable format, make it possible for different clients and servers to interact. Once the block of data is extracted, the backup server 104 can use its own proprietary methods for handling the data block.

The sequence 400 may also include operation 424, which comprises sending the block of data to a storage device. For example, the backup server 104 may send the block of data to one of the storage devices 106, 108, 110. As an example, the data may be stored on the storage device in a manner such that the block of data and any other blocks of data in the backup are stored as sequential data blocks. Generally, the server extracts the block of data from the CIM/XML packet, and stores the block of data on the storage device, but typically does not store the CIM/XML header. The server may use a server-specific method for storing and retrieving data from the storage device. In some embodiments the data blocks have a small CIM/XML header that helps the application identify the type (datablock), source, and sequence.

The sequence 400 may also include operation 426, which comprises determining if there are additional blocks to be backed up in the backup. As an example, operation 426 may be performed by the backup client 116. If there are additional blocks to be backed up, then one or more of operations 410 to 426 may be repeated. Sequence 400 may also include operation 428, which comprises recording backup metadata associated with the backup in a backup server database, which for example, may be internal to the backup server 104. As an example, the backup metadata may be stored using the backup server's proprietary format. As another example, the backup metadata may be stored as a CIM object. Operation 428 may also include storing a transaction log, which may also be stored as a CIM object. The transaction log may be described as a CIM object, in order to permit transferring the data to the backup server 104. Once the transaction log data is at the backup server 104, the backup server 104 may store the transaction log data in a proprietary format used by the backup server, or may store the transaction log data as a CIM object.

The sequence 400 may also include operation 430, which comprises transmitting information indicating that the data has been successfully backed up and that the backup has been completed. As an example, the message indicating that the data has been successfully backed up may be transmitted from the backup client 116 to a user. The sequence 400 also may include using CIM to describe initial handshaking, metadata transfer, bulk data transfer, transaction log processing, and ending operations.

If desired, the sequence 400 may also include operations for restoring data blocks from one or more of the storage devices 106, 108, 110. Thus, the sequence 400 for a method for backing up data, may also include restoring data. Alternatively, in some embodiments, the operations for restoring data may be performed without also performing operations for backing up the data. The techniques described herein for backing up data may generally employed for restoring data, with the operations generally being performed in a reverse direction.

The sequence 400 may include one or more of the following operations for restoring data. Referring to FIG. 4C, the sequence 400 may include operation 432, which comprises receiving a request to restore at least some of the data. As an example, a user may make the request. The sequence 400 may also include operation 434, which comprises retrieving a block of backed up data from a storage device 106, 108, 110. As an example, the backup server 104 may retrieve the block of backed up data. The sequence 400 may also include operation 436, which comprises generating a secondary data packet that includes the block of backed up data, wherein the block of backed up data is included in a common information protocol object, that may also include a description of the backed up data. As an example, the common information protocol may be CIM. As an example, the secondary data packet may include at least some information written in a markup language, for example XML. In some examples, the secondary data packet may be called an XML packet. Sequence 400 may also include operation 438, which comprises transmitting the secondary data packet. As an example, the secondary data packet may be transmitted from the backup server 104 to the backup client 116. Thus, in some examples the backup server 104 encapsulates the data in a CIM packet and sends it to the backup client 116. Sequence 400 may also include operation 440, which comprises determining if there are additional data blocks to restore, and if so, one or more of operations 434, 436, and 438 may be repeated. Sequence 400 may also include operation 442, which comprises receiving the secondary data packet. As an example, the secondary data packet may be received by the backup client 116. Sequence 400 may also include operation 444, which comprises interpreting the secondary data packet. Sequence 400 may also include operation 446, which comprises extracting the block of backed up data from the secondary data packet. As an example, the backup client 116 may perform the interpreting and extracting operations. Sequence 400 may also include operation 448 which comprises sending the block of backed up data to a desired location. For example, the block of backed up data may be restored to its original location, or to an alternate location. As an example, operation 448 may be performed by the backup client 116.

Some examples of the invention permit performing backup and restore operations by using CIM objects and CIM descriptions, wherein backup and restore objects, and the devices used to store them, are modeled using CIM. At runtime, the backup client 116 and the backup server 104 may send messages to each other as XML documents that describe CIM objects. Thus, the host 102 and server 104 may communicate using XML. Any suitable language may be used to write the XML. The CIM/XML can then be sent using a variety of transport mechanisms, including HTTP. This transport mechanism can contain both the control information and the actual data, and may be sent, for example, over Fibre Channel, and in this case the communications are called "inband". Alternatively a TCP/IP communications link could be used for the control information, the actual data, or both. Thus, inband or outband CIM could be used.

In summary, some examples of the invention permit describing backup types and objects using CIM, thereby allowing different backup software packages to interoperate. In some implementations, it may be possible to take a backup made to one server and migrate the backup to another server. With some examples of the invention, backup types such as full, incremental, differential, snapshot, and LAN-free, may be described using CIM. Backup objects that may be described using CIM may include any of the following, for example: a host, a server, a CPU in a server, a block of data, a database log, a description of a backup, a backup type, an entire backup (such as a backup performed on a particular day), as well as objects such as log files and database files which may be within another object such as a backup performed on a particular day.

Further, backup and restore operations, such as initial handshaking, metadata transfer, bulk data transfer, transaction log processing, and ending operations, may be described using CIM and CIM objects. With some examples of the invention, backed-up data may be stored in a CIM-compliant format, so that any client can use data backed up by any other client. Specifically, metadata may be stored in a common format, transaction logs may be stored in a set format, and data may be stored as sequential data blocks that can be processed by any client. Thus, some examples of the invention beneficially permit a first vendor's client to interoperate with a second vendor's server. Further, some examples of the invention beneficially permit backing up a file system or database using a first client software, storing that backup using a second server software, and restoring the data using a third client software.

III. OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A computer-implemented method, comprising:
 creating, at a backup client, a description of a backup, wherein the description of the backup is a common information protocol object, and wherein the common information protocol is CIM;
 transmitting the description of the backup from the backup client;
 transmitting, from the backup client, a request for a database to prepare for the backup;
 requesting a block of data from the database;
 receiving the block of data, at the backup client;
 generating, at the backup client, a packet that includes the block of data and metadata, wherein the block of data and the metadata are included in a common information protocol object that is a CIM object, and wherein the packet includes:
  the common information protocol object that is the CIM object that is a description of the data;
  a type indicator that is configurable to be indicative of one of a backup operation and a restore operation;

a backup type identifier that indicates one of an incremental backup and a differential backup; and a TCP/IP header, a HTTP header, a data size information, a date and time information, a source machine identifying information, a destination machine identifying information, a sequence number, and a source location information;

transmitting the packet from the backup client to a server;

interpreting, by the server, the packet transmitted by the client; and sending the block of data to a storage device.

2. The method of claim 1, wherein the method further comprises:

receiving the packet; and extracting the block of data.

3. The method of claim 1, wherein the packet includes at least some information written in XML.

4. The method of claim 2, wherein the method further comprises:

storing backup metadata as a CIM object in a backup server database that is internal to the backup server;

storing a transaction log as a CIM object; and storing the block of data in the storage device in a CIM compliant format.

5. The method of claim 1, wherein the packet is transmitted to a backup server, wherein the backup client is from a first vendor and the backup server is from a second vendor that is different than the first vendor.

6. The method of claim 1, wherein the description of the backup is written in XML.

7. The method of claim 1, wherein the description of the backup created at the backup client includes some of the metadata.

8. The method of claim 1, wherein the description of the backup includes a backup type, wherein the backup type is chosen from the group consisting of full, incremental, differential, and copy and wherein the description of the backup is written in XML and is a CIM object.

9. The method of claim 8, wherein the description of the backup includes an additional backup type, wherein the additional backup type is chosen from the group consisting of snapshot, serverless, LAN, and LAN-free.

10. The method of claim 1, wherein the method further comprises using CIM to describe initial handshaking, metadata transfer, bulk data transfer, transaction log processing, and ending operations.

11. The method of claim 1, wherein the method further comprises recording backup metadata associated with the backup in a backup server database, wherein the backup metadata is stored as a CIM object.

12. The method of claim 1, wherein the method further comprises storing backup metadata and transaction logs as CIM objects.

13. The method of claim 1, wherein the method further comprises storing the block of data and additional blocks of data as sequential data blocks.

14. The method of claim 1, wherein the method further comprises:

receiving a request to perform the backup; and transmitting the description of the backup.

15. The method of claim 1, wherein the method further comprises:

receiving a request to restore at least some of the data;

retrieving a block of backed up data from the storage device;

generating a secondary data packet that includes the block of backed up data, wherein the block of backed up data is included in a common information protocol object; and transmitting the secondary data packet.

16. The method of claim 15, wherein the method further comprises:

receiving the secondary data packet;

interpreting the secondary data packet;

extracting the block of backed up data from the secondary data packet; and sending the block of backed up data to a desired location.

17. The method of claim 16, wherein the block of backed up data included in the secondary data packet is included in a CIM common information protocol object.

* * * * *